US006883225B2

(12) United States Patent
Fowler

(10) Patent No.: US 6,883,225 B2
(45) Date of Patent: Apr. 26, 2005

(54) METHOD OF USING A UNIVERSAL MANIFOLD HOLDING FIXTURE

(76) Inventor: Ladd Fowler, 271 Palo Alto Ave., Mountain View, CA (US) 94041

( * ) Notice: Subject to any disclaimer, the term of this patent is extended or adjusted under 35 U.S.C. 154(b) by 0 days.

(21) Appl. No.: 10/684,670

(22) Filed: Oct. 14, 2003

(65) Prior Publication Data

US 2004/0188907 A1 Sep. 30, 2004

Related U.S. Application Data

(63) Continuation of application No. 10/397,886, filed on Mar. 26, 2003, now Pat. No. 6,663,095.

(51) Int. Cl.[7] .................................................. B23Q 3/00

(52) U.S. Cl. ........................ 29/559; 29/281.1; 269/287; 269/246; 269/137

(58) Field of Search ................................ 29/559, 281.1, 29/281.5; 269/137, 111, 139, 247, 251, 285, 279–284, 296

(56) References Cited

U.S. PATENT DOCUMENTS 4,200,273 A * 4/1980 Das Gupta et al. ........... 269/61
4,843,861 A * 7/1989 Langley ........................ 72/306
6,276,047 B1 * 8/2001 Webster et al. ............... 29/559

* cited by examiner

*Primary Examiner*—Robert C. Watson
(74) *Attorney, Agent, or Firm*—Damon K. I. Kali

(57) ABSTRACT

A universal manifold holding fixture for holding intake manifolds from v-type engines that establishes and maintains a centerline alignment with respect to the intake manifold and a centering shaft; said centering shaft is configured to be receivable into various machining tools. The fixture is adjustable in three axes and configurable to accommodate intake manifolds from various manufacturers. The fixture also maintains the intake manifold in isometric tension thus simulating actual service conditions. The fixture provides engine machinists with a solution to handling large, heavy, and unwieldy intake manifolds while machining the manifold surfaces.

8 Claims, 7 Drawing Sheets

METHOD OF USING A UNIVERSAL MANIFOLD HOLDING FIXTURE

CROSS-REFERENCE TO RELATED APPLICATIONS

This application is a continuation of U.S. patent application No. application Ser. No. 10/397,886, filed Mar. 26, 2003, now U.S. patent No. 6,663,095.

BACKGROUND

Generally speaking, difficulties in repairing manifolds arise from the inability to adequately secure manifolds in place, center and align manifolds during machining, and adapt manifold holding tools to accommodate resurfacing equipment from diverse manufacturers. Since "V" block designed engines were introduced to the general automotive consumer in the 1930's and 40's, dedicated tooling at the Original Equipment Manufacturer (OEM) level has been required to create precision intake and exhaust manifolds having very specific angle and size limitations. This specialized tooling has typically been unavailable to the average automotive rebuilder. Thus, manifolds having reparable damage in the form of corrosion, cracks, and warp are often discarded because remachining those manifolds to original specification is exceedingly difficult without manufacturer specific tooling. Even in circumstances where specialized tooling is available, the variety and type of manifolds generally encountered by the typical automotive rebuilder renders any type of specialized tooling of limited utility: modifying OEM tooling to accommodate various OEM manifolds is nearly impossible.

Prior Approaches

Because accurately machining a manifold is so difficult, many shops have adopted questionable practices to compensate for their inability to precisely machine damaged manifolds. For example, some shops cut the cylinder head's manifold mounting face to compensate for material that should have more properly been removed from the manifold mounting face itself. This practice creates heads that are no longer standard and therefore not freely interchangeable within their customary applications. Other shops drill oversized intake manifold bolt holes so that the intake manifold appears to fit the engine block properly while in fact it does not. This practice often results in hidden problems—e.g. port misalignment, vacuum leaks, and fluid leaks. Still other shops sell replacement manifolds rather than attempt difficult repairs that, given the proper tooling, would otherwise be cost effective to repair. Finally, some shops, attempting to overcome the lack of tooling, use abrasive belts to machine manifolds. Although manifolds machined with abrasive belts have the appearance of precision machining, the opposite is true because the machinist cannot retain adequate control over the machining process.

Finally a costly practice in the automotive repair industry is modifying manifolds for use with performance engines. Often performance shops create modified engine blocks and cylinder heads that cannot accommodate OEM manifolds. Machining manifolds to match custom blocks and heads requires a high degree of skill and precision causing a completed performance engine's price to be substantially higher than conventional repair and machining.

These practices combine to cause more problems than they solve resulting in poorly machined manifolds and inadequately repaired engines.

SUMMARY OF THE INVENTION

The present invention is a universal manifold holding fixture for holding intake manifolds during machining processes comprising a length adjusting assembly that establishes and maintains a centerline with respect to the fixture and the intake manifold held by the fixture. The length adjustment assembly comprises a centering shaft for attachment with a machining tool, a pair of adjustable endplates in communication with the centering shaft and a pair of length adjusting plates for accommodating intake manifolds of varying lengths in the fixture.

The holding fixture further comprises a manifold attachment assembly comprising a centering slide block and a carburetor flange mounting plate. The centering block centers the intake manifold with the centering shaft. In one embodiment, the centering block is clamped to the centering shaft. In yet another embodiment, the centering block is milled from aluminum to avoid marring the centering shaft. The carburetor flange mounting plate serves to attach the intake manifold with the fixture. In on embodiment, the carburetor flange mounting plate is configured to receive a plurality of different manifolds. In another embodiment the plate is configured to receive a specific manifold.

The holding fixture further comprises a machining guide assembly. The purpose of the machining guide assembly is to align the intake manifold to the centerline established by the centering shaft. Once the intake manifold is aligned to the centering shaft, it is removed to allow machining of the intake manifold. In one embodiment, the machining guide assembly comprises a pair of side locating bars that are adjustable to different intake manifold specifications. In another embodiment, the machining guide assembly comprises a pair of bottom centering plates, which are aligned with a user defined center hole located on the intake manifold.

Finally, the holding fixture comprises a clamping assembly to provide tension across the manifold. The clamping assembly comprises a plurality of split ring clamping collars that may be adjusted along the centering shaft. The clamping rings further comprise collar-clamping bolts that exert isometric tension to the intake manifold. In one embodiment the collar-clamping bolts are stepped to accommodate varying intake manifold bolt holes.

DETAILED DESCRIPTION OF THE DRAWINGS

Figure 1:
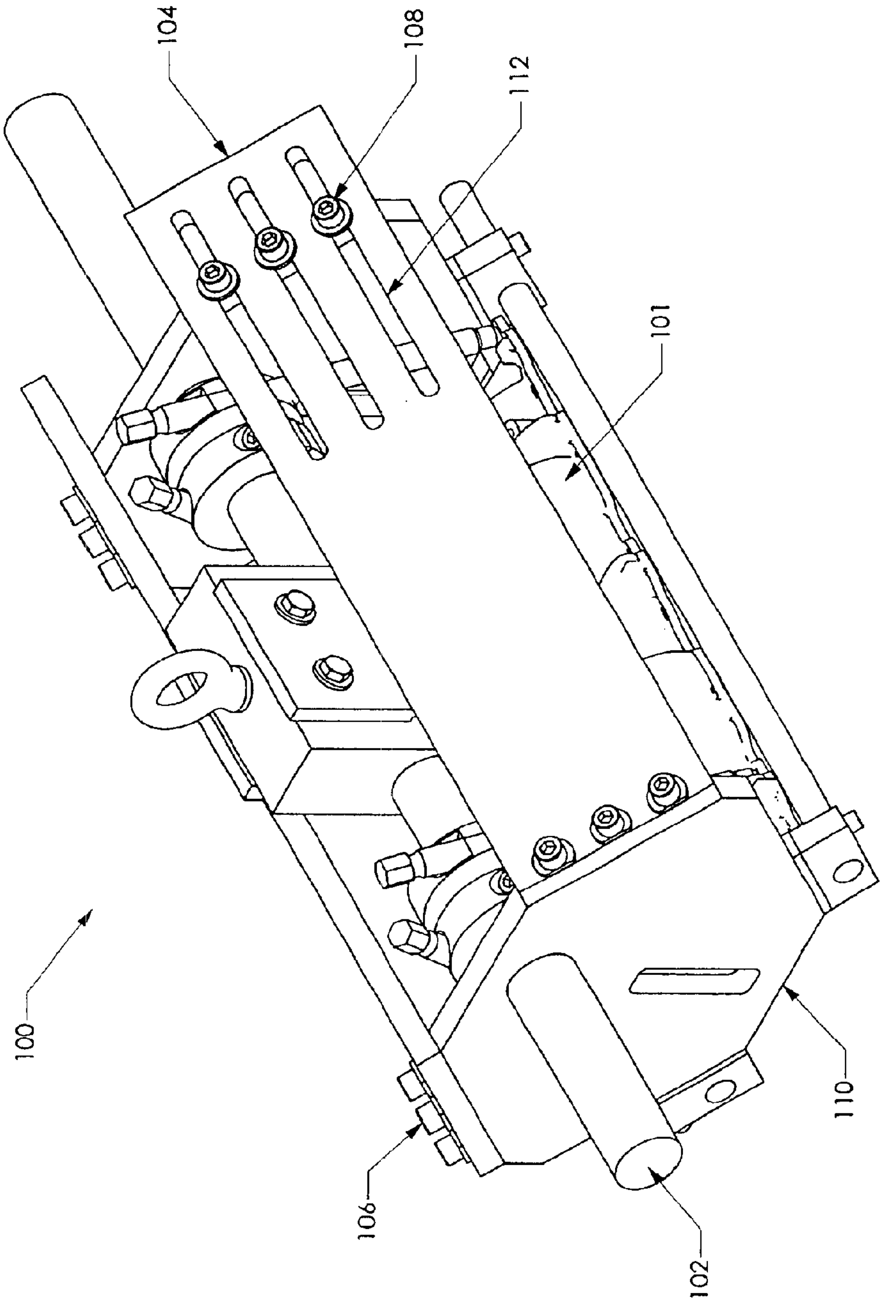
FIG. 1 is an isometric illustration of an embodiment of the universal manifold holding fixture.

FIG. 1 is an isometric illustration of an embodiment of the present invention. The universal manifold holding fixture (100) is shown holding a manifold (101). The fixture (100) comprises several functional components including a length adjustment assembly, a manifold attachment assembly (200), a machining guide assembly (500), and a clamping assembly (700). Each of these functional groups will be discussed at length below.

The length adjustment assembly is comprised first of a centering shaft (102). The centering shaft (102) allows the fixture to be rotated about its major axis and allows the fixture to be held by a machining tool. In this manner, the centering shaft may present various faces of a manifold to machine tool's cutter. The centering shaft (102) is configured to accommodate standard machine tool supports, which allow easy attachment and removal of the fixture with its accompanying intake manifold (101). In one embodiment of the present invention, the centering shaft (102) is circular in cross-section. It may be appreciated by one skilled in the art that the shaft may have different cross-sections to accommodate specialized tooling chucks without departing from the present invention.

As illustrated in FIG. 1, a pair of endplates (110) supports the centering shaft (102). The endplates (110) are substantially parallel as illustrated. In one embodiment of the present invention, the endplates (110) are a matched pair. In yet another embodiment of the present invention, the endplates (110) are machined to receive the centering shaft (102) to a tolerance of within about 0.0003 inches. By machining the endplates (110) to precise tolerance, the centering shaft (102) may be freely rotated and laterally adjusted while clamping the intake manifold (101) without deviating from an established centerline. A pair of length adjusting plates (104) is removeably attached to the endplates (102) by a plurality of bolts (106, 108). The length adjusting plates (104) are substantially parallel to the centering shaft (102) and substantially perpendicular to the endplates (110). In one embodiment, each length adjusting plate (104) is configured with several slots (112) so that the fixture may accommodate manifolds of varying length. At one end of the fixture, the length adjusting plates (104) are removeably affixed to an endplate (110) with bolts (106) while at the opposite end of the fixture, the length adjusting plates (104) are slidingly attached with an endplate (110) with bolts (108). One skilled in the art will readily recognize that length adjusting plates (104) may be configured without slots to accommodate a manifold of a single length without departing from the present invention.

Figure 2B:
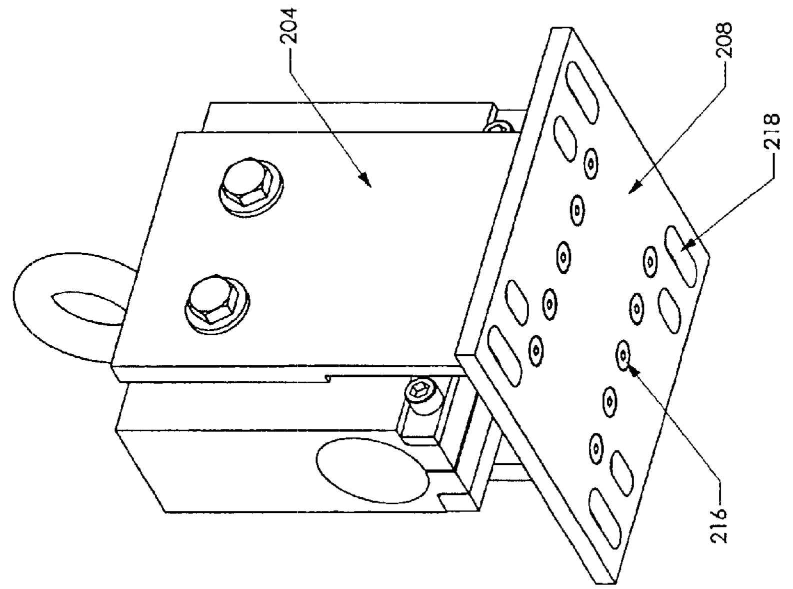
FIG. 2B is an isometric illustration of the manifold attachment assembly showing the carburetor flange mounting plate.
Figure 2A:
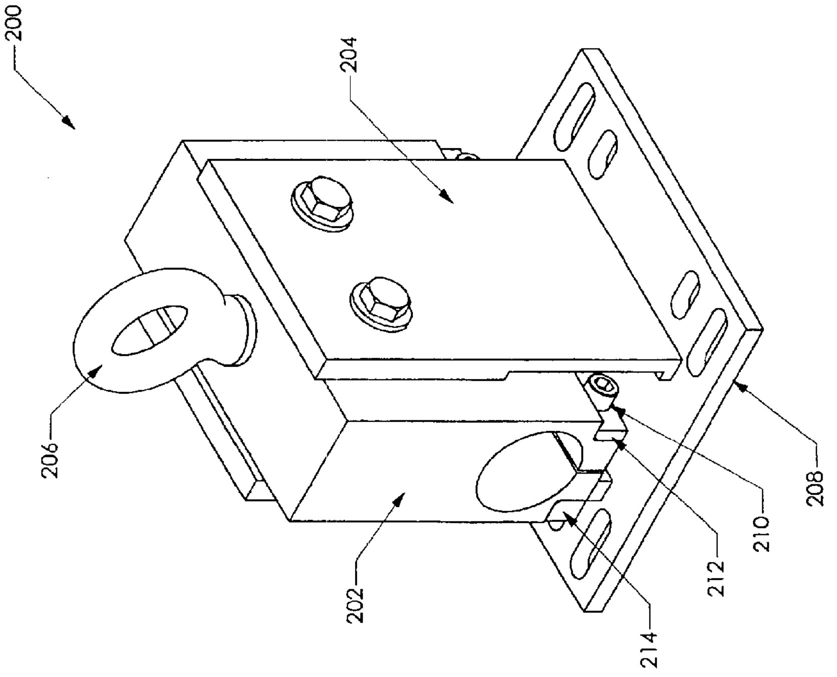
FIG. 2A is an isometric illustration of the manifold attachment assembly.
Figure 3:
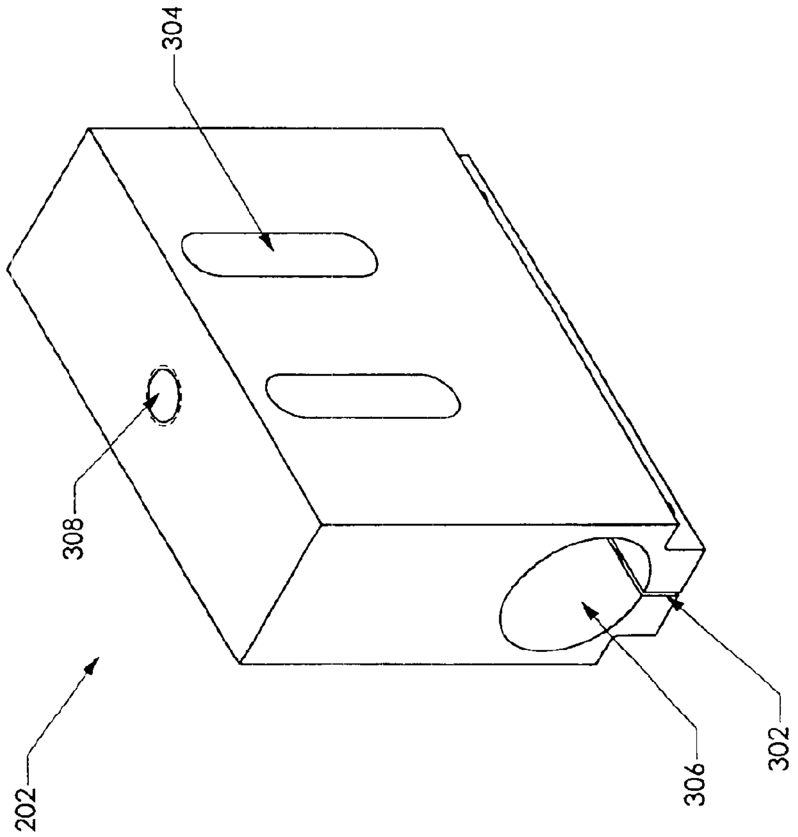
FIG. 3 is an isometric illustration of the centering slide block.

The manifold attachment assembly (200) is illustrated in FIGS. 2A and 2B. The manifold attachment assembly is comprised first of a centering slide block (202). The centering slide block (202) is further illustrated in FIG. 3. Referring to FIG. 3, the centering slide block (202) is configured with a shaft receiver (306) to allow the centering slide block to freely slide and rotate on the centering shaft (102). The shaft receiver (306) is configured with a clamping gap (302), which allows the diameter of the shaft receiver (306) to be reduced thus clamping the centering slide block (202) with the centering shaft (102). The centering slide block (202) is further configured with through slots (304) to allow the side plates (204, FIG. 2A) to be slidingly attached with the centering slide block (202) without the manifold deviating from an established centerline created by the centering shaft (102). Because the height component of intake manifolds varies among different manufacturers, this feature allows the fixture to accommodate different manifolds. Finally, with respect to the centering slide block (202), in one embodiment of the present invention, a threaded hole (308) is placed on the upper surface of the centering slide block (202) to accommodate lifting eyes (206, FIG. 2A) for easy lifting of the fixture. As may be appreciated by one skilled in the art, lifting eyes may be attached with the centering slide block (202) by any method well known in the art without departing from the present invention.

Referring again to FIG. 2A, the centering slide block (202) is clamped with clamping bolts (210), wear plate (212), and clamping plate (214). The wear plate (212) is utilized to avoid marring or otherwise damaging the centering slide block (202). The clamping plate (214) is utilized to evenly distribute the clamping force on the centering shaft (102). In other embodiments the wear plate (212) and the clamping plate (214) may be omitted to reduce weight where weight is a primary concern. In still other embodiments, the centering slide block (202) is comprised of a ductile material such as aluminum, to reduce weight and to avoid marring the centering shaft (102).

Figure 4:
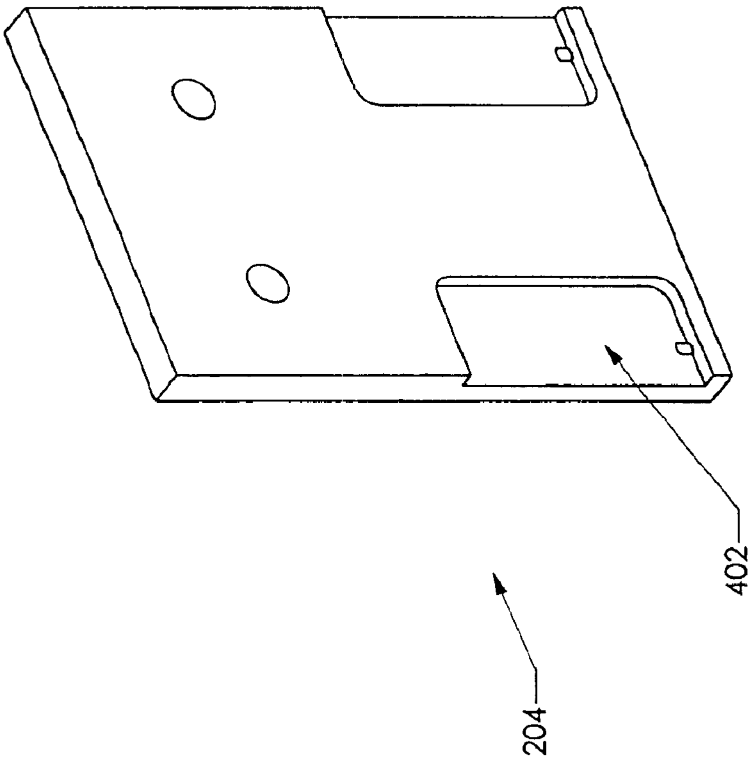
FIG. 4 is an isometric illustration of a slide plate.

The slide plates (204) are slidingly attached to the centering slide block (202) as discussed above. The slide plates (204) are further machined to provide clearance for clamping bolts (210) as illustrated in FIG. 4. As shown, a clearance slot (402) allows the slide plate (204) to be adjusted vertically with respect to a manifold (101) without interfering with the clamping bolts (210). Referring to FIG. 2B, the slide plates (204) are removeably attached substantially perpendicular with the carburetor flange mounting plate (208) by a plurality of recessed bolts (216). A plurality of slots (218) is disposed about the carburetor flange mounting plate (208) such that various manifold bolt patterns may be accommodated. In other embodiments, a manufacturer specific carburetor flange mounting plate may be fitted to the side plates (204) without departing from the present invention.

Figure 5:
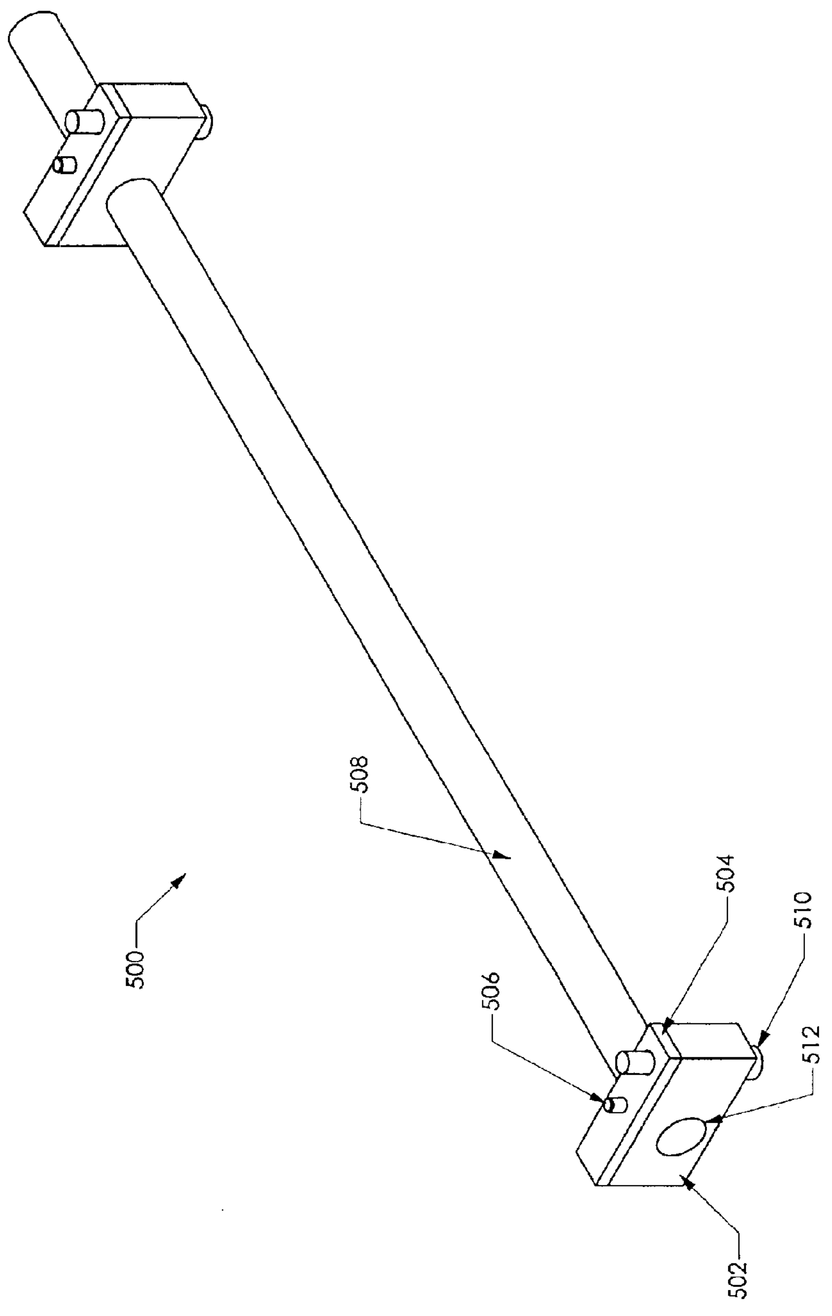
FIG. 5 is an isometric illustration of one embodiment of the machining guide assembly.

FIG. 5 is an isometric illustration of one embodiment of the machining guide assembly (500). The purpose of the machining guide assembly (500) is to further align the mounting bolt hole flange of the intake manifold (101) with the established centerline created by the centering shaft (102). As illustrated, the machining guide assembly (500) is comprised of a centering adapter block (502). The centering adapter block (502) is configured to slidingly attach with a side locator bar (508). In an embodiment of the present invention, the centering adapter block (502) is configured to receive the side locator bar (508) off-center. That is, the receiving hole (512) in the centering adapter block (502) is off-center with respect to both directions of the centering block's face. As will be appreciated by one skilled in the art, this design allows alignment of varying intake manifold bolt hole flanges from different manufacturers with the fixture. In practice, by alternately rotating and flipping the centering adapter block (502), four different alignment patterns may be achieved. To further accommodate differing manufacturers' intake manifolds, a centering adapter block shim (504) may be added to each centering adaptor block (502) and disposed between the endplate (110) and the centering adaptor block (502). Thus, an additional four alignments may be achieved with the present invention. As will be appreciated by one skilled in the art, variations in shim thickness may be utilized without departing from the present invention. The centering adaptor block (502) is removeably attached with the endplate (110) by a bolt (510) and located on the endplate by a dowel pin (506). In this configuration, the centering adaptor block (502) is easily located, attached, and removed from the endplate (110).

Figure 6B:
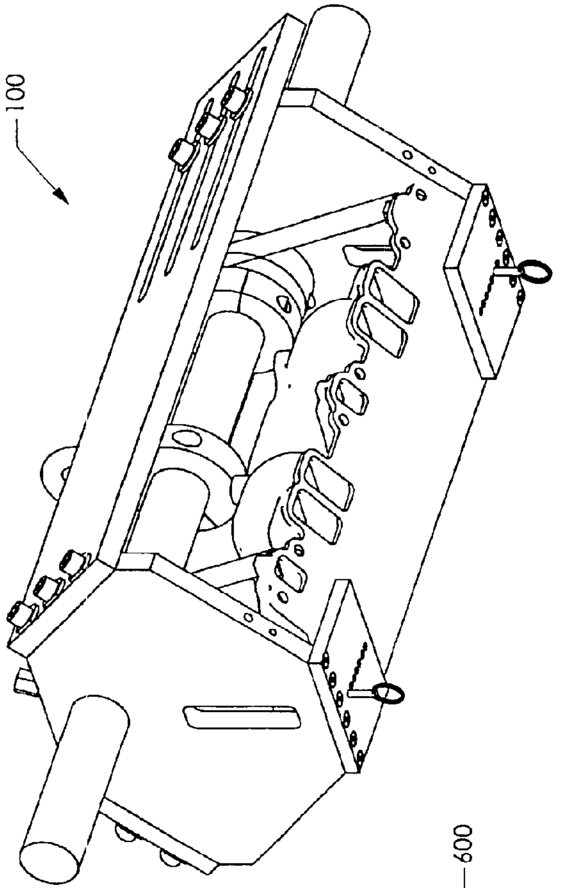
FIG. 6B is an isometric illustration of an alternative embodiment of the machining guide assembly installed on the universal manifold holding fixture.
Figure 6A:
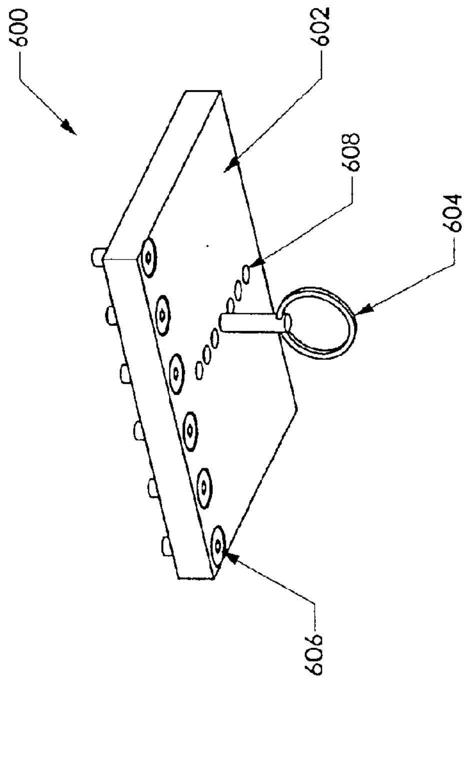
FIG. 6A is an isometric illustration of an alternative embodiment of the machining guide assembly.

As will be appreciated by one skilled in the art, bolt alignment patterns are not always uniform in an intake manifold. Therefore, an alternate method of centering the intake manifold is presented herein. FIG. 6A is an isometric illustration of an alternative embodiment of the machining guide assembly (600). FIG. 6B is the alternative embodiment installed on the universal manifold holding fixture (100). Referring to FIG. 6A, the alternative embodiment of the machining guide assembly (600) is comprised of a bottom centering plate (602) configured to removeably attach with the endplate (110) by recessed bolts (606). A centering pin (604) locates a centering hole on an intake manifold. The centering pin may be inserted along a plurality of centering holes (608), which centering holes (608) are disposed along an axis substantially perpendicular to the endplate (110) and aligned with the centering shaft (102). As is well known in the art, tools exist to locate and drill the precise center of a manifold. The centering pin (604) locates and captures the drilled center hole on the intake manifold. In this manner, the centerline of the manifold is readily established with respect to the centering shaft (102).

Figure 7:
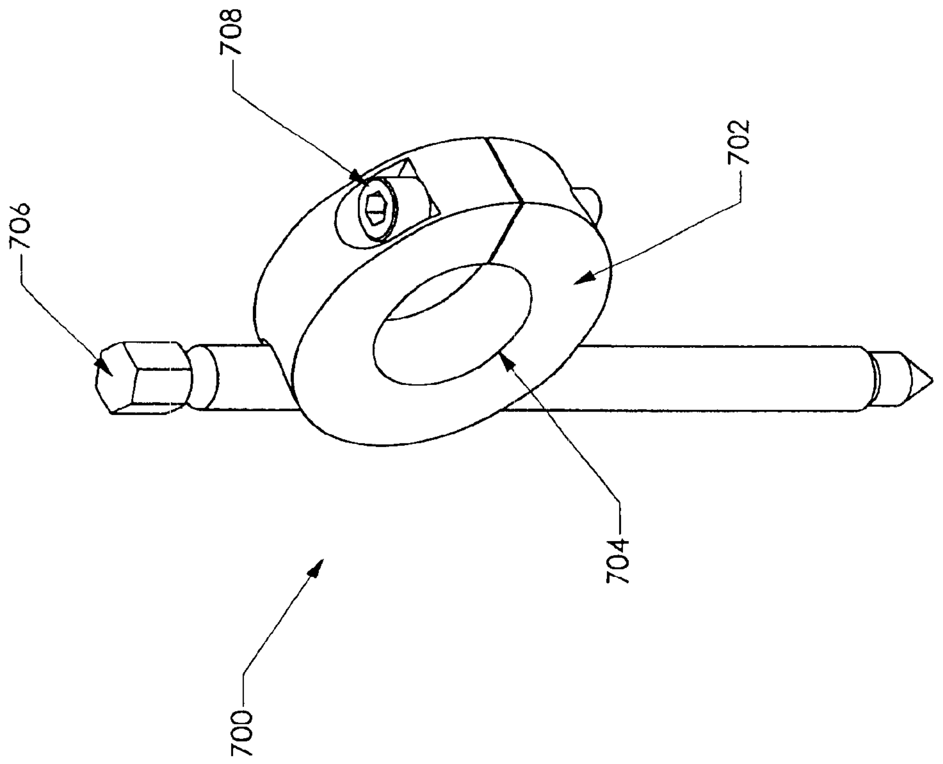
FIG. 7 is an isometric illustration of the clamping assembly.

FIG. 7 is an isometric illustration of the clamping assembly (700). The clamping assembly (700) provides isometric tension to the intake manifold (102). The clamping assembly (700) is comprised of a split ring clamping collar (702) configured to slidingly receive the centering shaft (102) through the inner receiving hole (704). A collar-clamping bolt (708) is provided to removeably set the split ring clamping collar (702) in position on the centering shaft (102). A tensioning bolt (706) is tangentially attached with the split ring clamping collar (702). The tensioning bolt (706) is located to center on an intake manifold bolt hole by positioning the split ring clamping collar (702) laterally and rotationally about the centering shaft (102). Once the tensioning bolt (706) is located to the bolt hole, the collar-clamping bolt (708) is tightened to secure the split ring clamping collar (702) in position. Tensioning force is then applied to the manifold by the tensioning bolt (706). In this manner, the fixture (100) and manifold (102) are placed in active tension with respect to each other thus stabilizing the entire structure. Further, the active tension created by the fixture operates to simulate the active tension exerted between a manifold and an engine block in actual service. In one embodiment of the present invention, the ends of the collar-clamping bolts are stepped to accommodate differing bolt hole sizes.

What is claimed is:

1. A method of holding a manifold comprising the steps of:

a) providing a universal manifold holding fixture;

b) adjusting the length of the universal manifold holding fixture such that the fixture is at least as long as the manifold;

c) attaching the manifold with a manifold attachment assembly such that the manifold is slidingly attached with the universal manifold holding fixture;

d) aligning the manifold with a machining guide assembly;

e) clamping the manifold with a clamping assembly such that the manifold is held in isometric tension with respect to the universal manifold holding fixture f) removing the machining guide assembly prior to machining.

2. The method of claim 1 wherein adjusting the length of the universal manifold holding fixture comprises:

a) providing a centering shaft appropriate for attachment with a machining tool;

b) positioning a pair of substantially parallel endplates along the centering shaft such that the manifold is completely encompassed by the universal manifold holding fixture;

c) locking into position the pair of substantially parallel endplates with at least a pair of length adjustment plates such that the centering shaft and the substantially parallel endplates are substantially perpendicular with respect to the length adjustment plates.

3. The method of claim 2 wherein the locking into position is accomplished by clamping the centering shaft.

4. The method of claim 1 wherein attaching the manifold with a manifold attachment assembly comprises:

a) providing a centering slide block having a manifold mounting plate for attachment with the manifold;

b) attaching the manifold with the manifold mounting plate.

5. The method of claim 2 wherein aligning the manifold with a machining guide assembly comprises:

a) providing a plurality of centering adapter blocks that are removably attached with the pair of substantially parallel endplates;

b) attaching a pair of side locating bars with the plurality of centering adapter blocks;

c) locating the manifold onto the side locating bars such that the manifold is aligned and centered with the centering shaft.

6. The method of claim 5 wherein providing a plurality of centering adapter blocks further comprises:

providing shimming material between the centering adapter blocks and the endplates such that manifolds of varying size may be accommodated in the fixture.

7. The method of claim 1 wherein clamping the manifold with a clamping assembly comprises;

a) providing a plurality of split ring collar clamps having a corresponding collar-clamping bolt;

b) aligning the split ring collar clamps with a plurality of manifold bolt holes;

c) clamping the manifold by applying tension to the manifold with the collar-clamping bolts such that the manifold is held in isometric tension.

8. The method of claim 1 wherein aligning the manifold with a machining guide assembly comprises:

a) providing a bottom centering plate whereby the center of the manifold may be located to the universal manifold holding fixture;

b) aligning a manifold centering hole with the bottom centering plate;

c) inserting a centering pin through the bottom centering plate into the manifold centering hole whereby the central axis of the manifold may be aligned with the centering shaft.

* * * * *